Aug. 17, 1965

J. W. HESSION, JR 3,200,535

APPARATUS FOR CREATING AEROSOL DISPERSIONS

Filed Sept. 10, 1963

INVENTOR
John W. Hession, Jr.
BY
Blair + Buckles
ATTORNEYS

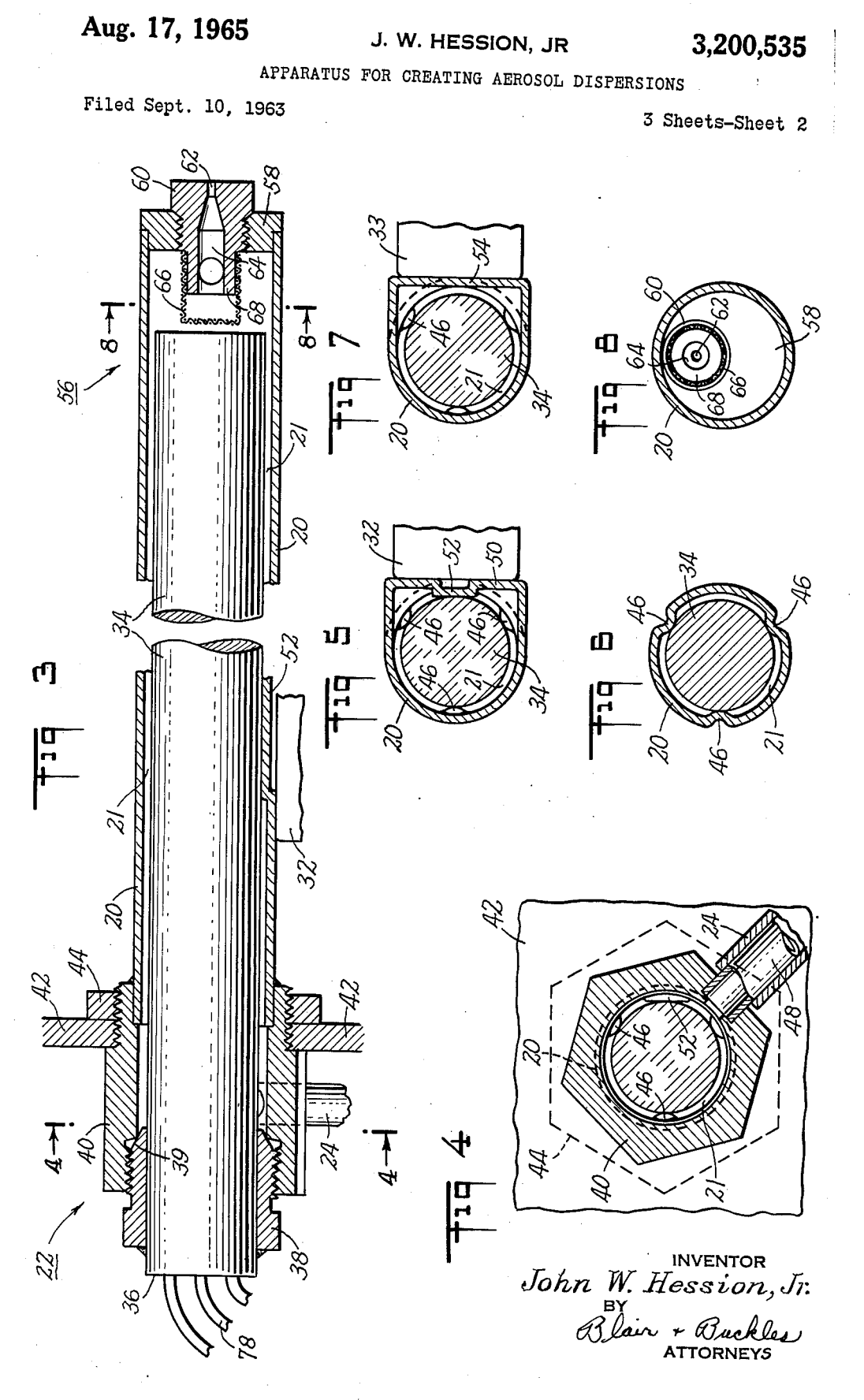

Aug. 17, 1965   J. W. HESSION, JR   3,200,535
APPARATUS FOR CREATING AEROSOL DISPERSIONS
Filed Sept. 10, 1963   3 Sheets-Sheet 3

INVENTOR
John W. Hession, Jr.
BY
Blair + Buckles
ATTORNEYS

United States Patent Office 3,200,535
Patented Aug. 17, 1965

3,200,535
APPARATUS FOR CREATING AEROSOL DISPERSIONS
John W. Hession, Jr., New Canaan, Conn., assignor of one-third to George D. Besler, New York, N.Y., and one-third to Mark A. Hession, Darien, Conn.
Filed Sept. 10, 1963, Ser. No. 307,870
10 Claims. (Cl. 43—129)

This application is a continuation-in-part of my application Serial No. 59,926 filed October 3, 1960 entitled "Method and Apparatus for Creating Fine Liquid Aerosol Dispersions," now abandoned.

This invention relates to apparatus for producing aerosol dispersions, and more particularly, to insecticide carriers and solutions having controllable boiling ranges and to methods and apparatus for producing an aerosol containing a heat sensitive insecticide.

Prior art methods and apparatus for creating aerosol dispersions include a variety of insecticide "bombs" wherein a gas under pressure forces an insecticide solution through an atomizing nozzle for dispersion in the atmosphere. These devices include pressurized containers wherein a gas pressure is maintained over the insecticide solution or wherein the solution is mixed with a liquid such as water and a gas pressure is created above the solution upon heating the water-oil mixture in a reservoir to create a gas pressure. Other prior art devices have also been used wherein an oil solution of insecticide is sprayed or otherwise directed against a heated chamber or plate to be vaporized and then forced to the atmosphere under pressure. Such machines are generally referred to as "fogging" machines since they operate on principles developed by or for the military in making smoke screening devices.

Insecticides such as pyrethrins and rotenones have been approved for use in the food industry because of their non-persistence, i.e., the toxic effect of such insecticides will be largely dissipated over a 48-hour period or less. Further, the toxic effects of these insecticides to human beings is comparatively slight.

A further problem is encountered in prior art machines and insecticide solutions when water is used as the vaporizing constituent. Insecticides such as pyrethrins and D.D.V.P. (2,2 dichlorovinyl dimethyl phosphate) are substantially affected by exposure to water or water vapor, and insecticide solutions containing water and one of these insecticides cannot stand for any appreciable time without greatly affecting the insecticide's effectiveness.

Prior art methods and devices have a greatly reduced effectiveness with certain insecticides or under conditions requiring close control of particle size. The use of fogging machines, for example, has been found to be unsatisfactory with heat sensitive insecticides such as pyrethrum or rotenone. The heat sensitive insecticides invariably stick to the heated chamber or other surface of the fogging machine and after a period of time will char or carbonize, necessitating frequent cleaning of the machine heating chamber. Further, only a portion of the insecticide that was initially contained in the aerosol vehicle liquid is effectively dispersed to the atmosphere, since a substantial percentage of the insecticide is destroyed in the heating chamber.

If the carrier oil or oils are vaporized during heating in a fogging machine, the pyrethrins will not also vaporize but will form a "tarry" substance which sticks to the heated surface and with further heating will char or carbonize in place. Pieces of "tarry" or charred pyrethrum are then dislodged and may clog the vaporizing chamber and/or the atomizing nozzle or orifice of the aerosol machine. Thus, the thermal deterioration of insecticides such as the pyrethrins may reduce the insecticide effectiveness by 50 percent or more and necessitate frequent cleaning of the vaporizing chamber and orifice of the aerosol machine.

Particle size of the aerosol dispersion from a fogging machine is also a problem in that condensation of vaporized material is relied upon and is subject to the varying ambient temperatures into which a vapor is sprayed. Thus, the particle size from typical fogging machines may be so small that a lethal dose of insecticide is not carried to the insects. Thus, insects exposed to a sublethal dose of insecticide escape and may even develop an immunity to the insecticide being used.

The average particle size of an aerosol dispersion is important for a number of reasons. If the particle size is too large, e.g., 20 microns or more, the aerosol dispersion is considered "wet" and may settle out of the air too rapidly. Such a large particle size may also result in an undesirable film of oil on furnishings and the like when used inside a building, as well as injure or kill many plants and shrubs. Further, such large particles will not effectively penetrate into cracks and crevies where a great number of the insects are found.

If the average particle size in the aerosol dispersion is too small, the particles may not kill a number of insects. This is another drawback of some prior art aerosol machines wherein the average particle size is less than 1 micron.

For most insecticidal and acaricidal purposes an average particle size of from 5 to 10 microns has been found to give very effective results. With such a particle size, the aerosol dispersion is dry enough to penetrate cracks and yet carry a lethal dose of insecticide. Further, such an average particle size does not support combustion as do wet aerosol dispersions. Thus, the control of the average particle size of the aerosol dispersion not only optimizes the insecticide effectiveness but also contributes substantially to the safety of operation of the aerosol device.

The aerosol particle size is determined in part by the amount of the explosive atomizing force which disperses the liquid insecticide solution. Therefore, the pressure and temperature at which the solution is released to the atmosphere are controlling if a homogeneous petroleum distillate is used as the insecticide carrier. Thus, aerosol devices requiring temperature and pressure control within close tolerances may be unreasonably expensive.

The problem encountered in maintaining close control over the pressure and temperature of the insecticide solution may be compounded in an electrically operated aerosol device by voltage variations from the power source. If the aerosol particle size is to be controlled within the most effective limits, pressure and temperature must be held within close limits. Voltage variations, not only from a generating source but also from load variations from local outlets, pose a problem of electrically coordinating the pressure and temperature of the aerosol solution issuing from the machine.

Further, the prior art aerosol devices which rely upon extended heating of the insecticide solution to produce a propelling gas are subject to the drawbacks noted above, i.e., heat sensitive organic insecticides are subject to substantial deterioration if exposed to high temperature over an extended period of time.

Accordingly, it is an object of the present invention to provide methods of producing an areosol dispersion having a controlled particle size;

Another object of the invention is to provide methods of the above character wherein deterioration of heat sensitive insecticides is minimized;

A further object of the invention is to provide methods of the above character wherein the temperature and pressure of the aerosol solution is automatically coordinated;

Another object of the invention is to provide insecticide carriers and solutions wherein particle size of an aerosol dispersion is more easily controlled.

A further object of the invention is to provide an electric control for an aerosol machine;

Another object of the invention is to provide apparatus for carrying out the above methods;

A further object of the invention is to provide apparatus of the above character which is economical to manufacture and safe to operate.

Other objects of the invention will in part be obvious and will in part appear hereinafter.

The invention accordingly comprises the several steps and the relation of one or more of such steps with respect to each of the others, the apparatus embodying features of construction, combinations of elements and arrangement of parts which are adapted to effect such steps, and the insecticide carrier and solution compositions, all as exemplified in the following detailed disclosure, and the scope of the invention will be indicated in the claims.

For a fuller understanding of the nature and objects of the invention, reference should be had to the following detailed description taken in connection with the accompanying drawings, in which:

FIGURE 1 is a perspective view of the aerosol apparatus.

FIGURE 2 is an enlarged side view of the aerosol apparatus in partial section.

FIGURE 3 is an enlarged side sectional view of the pressure chamber taken along lines 3—3 of FIGURE 2.

FIGURE 4 is an end sectional view taken along lines 4—4 of FIGURE 3.

FIGURE 5 is an enlarged end sectional view taken along lines 5—5 of FIGURE 2.

FIGURE 6 is an enlarged end sectional view taken along lines 6—6 of FIGURE 2.

FIGURE 7 is an enlarged end sectional view taken along lines 7—7 of FIGURE 2.

FIGURE 8 is an enlarged end sectional view taken along lines 8—8 of FIGURE 3.

FIGURE 9 is a vaporization graph showing vaporization temperatures for two petroleum distillate fractions each alone and mixed together under different pressures.

FIGURE 10 is a schematic view of the automatic control circuitry for the apparatus.

Like reference characters refer to like parts throughout the several views of the drawings.

Referring now to FIGURES 1 and 2, it will be seen that the machine in general comprises an upper housing 10 having a carrying handle 12 with the orifice assembly 60 protruding from the front end of the housing. The housing 10 is removably secured to a reservoir 16 by clamps 18 to permit filling of the reservoir with insecticide solution. As shown in FIGURE 2, a pressure tube 20 surrounded by fiberglass insulation 14 is supplied with insecticide solution through its end 22 via conduit 24 which is connected to pump 26. Pump 26 is operated by motor 28 through rod 30 and is automatically controlled to provide a solution pumping rate coordinated with the temperature in pressure chamber 20 which is regulated by thermostatic switches 32 and 33.

In operation the pump 26 supplies insecticide solution to the pressure tube 20 wherein the solution is quickly heated as a relatively thin film and is then forced through orifice assembly 60 to the atmosphere. The insecticide solution, which is preferably a mixture of petroleum distillate fractions combined with insecticide, then atomizes upon reaching the atmosphere since the temperature of the petroleum distillate fraction in pressure chamber 20 is above the temperature at which a substantial portion of the petroleum fractions will vaporize at atmospheric pressure. This vaporization takes place with explosive atomizing force which disperses the liquid petroleum fraction into aerosol particles.

The insecticide solution is maintained under pressure as a liquid in chamber 20 and is exposed to heat therein for a very short period of time (preferably under 10 seconds) to prevent deterioration of the insecticide material. For clarity the wiring has been omitted in FIGURE 2 and is described hereinafter in reference to FIGURE 10. The pump motor and temperature of the pressure chamber are automatically coordinated for operation with different voltages as well as for safety and ease of operation.

Referring now to FIGURES 2–8, the invention will be described in more detail. As best seen in FIGURE 3, the pressure tube 20, which may be made of a metal or metal alloy such as brass, surrounds an elongated immersion heater 34 which may be secured at the end 36 by threaded collar 38 into a threaded sleeve 40 to form a pressure seal at 39. Sleeve 40 is secured to interior back wall 42 by a threaded retainer 44.

As shown in FIGURES 2 and 6, the pressure tube 20 is provided with three indentations 46 at one or more points spaced along the tube 20 to center the heater 34 within the pressure tube. For rapid heating of the insecticide solution, the diameter of the heater 34, and the internal bore of tube 20, may be for example .562 and .615 inch respectively. Thus over a substantial portion of the heater and pressure tube length the insecticide solution in space 21 is approximately .0265 inch in depth. Thus, except for those areas of the pressure tube which have been partially flattened to receive the thermostats 32 and 33 or in the small area of the indentations 46, this relatively thin layer or film of insecticide solution can be quickly heated.

As best seen in FIGURES 3 and 4 the pressure tube 20 is supplied with insecticide solution through conduit 24 which is secured over fitting 48 which is joined to the sleeve 40. As shown in FIGURE 2, the pressure tube 20 is inclined as about 10° from the horizontal to provide for the insecticide solution to surround the immersion heater 34 as the solution flows toward orifice assembly 60.

As best seen in FIGURES 2 and 5, the thermostat 32 is positioned on a flattened portion 50 of pressure tube 20 which as a longitudinal indentation 52 contacting the surface of sheath 70 of heater 34. As will be more fully explained hereinafter, thermostat 32 controls the larger capacity heating element 72 (FIGURE 10) which supplies a great amount of initial heat for the insecticide solution and it is therefore desirable to closely control the larger heating element by maintaining direct contact with the heater through indentation 52.

As best seen in FIGURES 2 and 7, the thermostatic switch 33 is also positioned on a flattened portion 54 of pressure tube 20 to sense temperature of the insecticide solution in the anterior end 56 of the tube 20. Thermostatic switch 33 controls the pump motor 28 and the smaller capacity heating element 74 (FIGURE 10) as will be more fully explained hereinafter.

Referring now to FIGURES 3 and 8, it will be seen that the end 56 of tube 20 is closed by plug 58 which includes a threadedly secured orifice assembly 60 having an orifice 62 which communicates with the interior of tube 20 through an enlarged opening 64. A fine mesh screen 66 may be secured to the anterior portion 68 of the orifice assembly to prevent the plugging of the orifice 62 by foreign matter which may be present in the insecticide solution.

Referring now to FIGURE 10, the control circuitry of the machine will be described in more detail. As schematically shown, the pressure tube 20 surrounds the immersion heater 34 to provide the relatively thin space 21 for a layer of film of insecticide solution to be heated prior to ejection through orifice 62. Insecticide solution is supplied from the reservoir 16 by pump 26 through conduit 24 to the pressure tube 20.

As described above the thermostatic switch 32 is positioned adjacent the posterior end of the pressure tube and has direct contact at 52 with the heater 34. Thermostatic switch 33 which is positioned near the anterior end 56 of the heater tube senses the temperature of the tube 20.

The immersion heater 34 comprises the sheath 70 having two heating elements 72, 74 therein which have a common connection 76 through conductor 78 to one side of an electrical power source indicated by the grounded plug 80.

The thermostatic switches 32 and 33 are both normally closed and provide current to the heating elements 72, 74 through on-off switch 82. Thermostatic switch 33 also provides current to the motor 28, but only under certain operating conditions which will now be described.

The operation of the control circuit will now be illustratively described.

Still referring to FIGURE 10 it will be seen that the closing of on-off switch 82 completes a circuit through normally closed thermostatic switches 32 and 33 to heat the resistance wire heating elements 72 and 74. With thermostatic switch 33 in a closed condition, the pump motor 28 is electrically shunted and will not run until switch 33 is opened at the proper temperature. Thus, no insecticide solution will be pumped from the reservoir 16 or through pressure tube 20 until switch 33 is opened.

Heating element 72 which may be a 1000-watt element is thus controlled by switch 32 which is set to open at 450° F. Thus at 450° F. switch 32 opens the circuit through heater element 72, but thermostatic switch 33, which is set to open at 485° F. will remain closed until that temperature is reached to continue to pass current through heating element 74 which may be a 240-watt element. These illustrative temperatures are those used with the insecticide solution shown graphically in FIGURE 9 and more fully described hereinafter.

When the temperature at thermostatic switch 33 reaches 485° F. switch 33 opens, which then places the pump motor 28 in series with the heating element 74 to pump insecticide solution from the reservoir 16 and into the tube 20 around immersion heater 34. Since the motor 28 and heating element 74 are in series, the heat generated in element 74 is substantially reduced. Heat also is provided by element 72 to offset the cooling effect of entering liquid near end 22 of tube 20. The motor 28 is an 80-volt motor, and when placed in series with heating element 74, the voltage drop across element 74 will be a third or less of what it was before switch 33 was opened. In operation the heating element 74 maintains the temperature of the liquid in tube 20 at 485° F. (±10°) with the pump motor 28 cycling on and off as thermostatic switch 33 opens and closes.

Thus it will be seen that both heating element 72 and 74 will quickly bring the immersion heater 34 up to above 450° F. before the 1000-watt heating element 72 is opened by thermostatic switch 32. The 240-watt heating element 74, however, will continue to heat the tube 20 to 485° at which time switch 33 opens to turn on the motor 28 and provide insecticide solution under pressure to the chamber 21 around the immersion heater. At any time during operation if the temperature of the insecticide solution in chamber 21 falls below 485°, switch 33 will again close to de-energize the pump motor and to provide for the full heating capacity of the element 74. Thermostatic switch 32 closes whenever the temperature of the liquid near end 22 of tube 20 falls below 450°, which is caused by the cooler entering liquid, as pointed out above. Thus switch 32 will normally be closed and heating unit 72 will be the major source of heat for the liquid in tube 20. In operation it has been found that the pump motor cycles on and off to provide and maintain the insecticide solution under pressure at the proper operating temperature.

Forcing of the heated solution through the constricted orifice creates sufficient back pressure to maintain the solution under a pressure of 50 pounds per square inch (gage). It should be understood that this pressure has been selected because of the vaporization characteristics of the insecticide solution which is specifically described hereinafter. If solutions with different vaporization characteristics are used, the pressure may be adjusted accordingly, provided there is sufficient pressure to maintain the heated solution as a liquid in the tube 20.

The insecticide carrier and solution of the invention will now be described. It has been found that a mixture of two petroleum distillate fractions having substantially divergent boiling points and particularly those having a divergence between the final boiling point of one oil and the initial boiling point of the other oil is easily controlled in an aerosol apparatus. The two oils are intermixed, and with the addition of a small amount of insecticide and in some cases a synergist, the resulting insecticide solution may be used with great effect against a variety of insects.

For the lower boiling oil, deodorized kerosene has been found to be suitable. For the higher boiling fraction, a mineral oil or a light hydraulic oil has been found to be suitable in admixture with the kerosene for the insecticide carrier. An analysis of two such suitable oils is as follows:

|  | Deodorized Kerosene | Mineral Oil |
|---|---|---|
| Gravity, ° API | 49.9 | 39.6 |
| Pour Point, ° F | −70 | 25 |
| Viscosity at 100° F. (SSU) | 33.8 | 41.0 |
| Color, ASTM (Saybolt) | 22 | 30 |
| Initial Boiling Point, ° F | 402 | 510 |
| Final Boiling Point, ° F | 480 | 620 |

Referring now to FIGURE 9, it will be seen that the vaporization of 100% deodorized kerosene takes place at atmospheric pressure from 402° to 480° Fahrenheit, as represented by the solid line A. Similarly, vaporization of a 100% mineral oil, represented by dashed line C, takes place at atmospheric pressure from 510° to 620° Fahrenheit. As will be noted, the center portions of both curves A and C are fairly flat in slope, and if a predetermined portion of either of these oils alone were to be heated to the vaporization point at atmospheric pressure, the temperature would have to be maintained within very narrow limits. Thus, if deodorized kerosene alone were heated to 430° Fahrenheit (under sufficient pressure to maintain it as a liquid) and released to the atmosphere, about 50 percent of the kerosene would vaporize with explosive force to break up the other 50 percent of the fraction into aerosol droplets. A relatively slight change in temperature of plus or minus 10° F., however, would greatly change the percentage of kerosene which would flash into vapor upon exposure to the atmosphere. Since the control of the amount of oil that vaporizes is essential to the control of the aerosol particle size, the particle size would be extremely difficult to control without very close temperature control.

It has been found that by employing a mixture of two oil fractions having divergent boiling points, that close temperature control is not required to vaporize the intended portion of the insecticide carrier. As shown in line B of FIGURE 9, a mixture of 50 percent deodorized kerosene, and 50 percent mineral oil will vaporize at atmospheric pressure with a very steep temperature rise required at the 50 percent point. This is because the final boiling point of the kerosene is 480° and the initial boiling point of the mineral oil is 510° Fahrenheit. Using such a mixture, a temperature of from 490 to 510° F. will maintain the percentage of vaporized oil between 49 and 51 percent. As shown by line A for deodorized kerosene alone, a temperature spread of plus or minus 10° Fahrenheit will result in vaporization of from 26 percent to 64 percent of the total carrier oil, with widely varying aerosol particle sizes resulting.

Line D in FIGURE 9 is the vaporization curve for a mixture of 50 percent deodorized kerosene and 50 percent mineral oil under 50 p.s.i.g., which is the pressure to be maintained in the pressure tube 20 (FIGURE 10). Thus if the thermostatic switch 33 is set to maintain the insecticide solution at 485° F. (±10 F.) then none of the oil mixture represented by line D will be vaporized in the chamber 21. Upon release to the atmosphere through the orifice 62, however, the deodorized kerosene portion of the insecticide solution will be explosively vaporized to disperse the remaining 50 percent of the mixture into aerosol droplets. The vaporized portion of the solution also quickly condenses as it is cooled in the atmosphere so that all of the insecticide is effectively used. The insecticide solution is rapidly heated under 50 p.s.i. of pressure for a very short period of time before it is released to prevent deterioration of the insecticide.

The particle size of the aerosol dispersion can thus be controlled by the percentage of low boiling oil in the mixture. For example, if a "wet" aerosol having a large average particle size is desired, the carrier oil mixture may be 30 percent deodorized kerosene and 70 percent mineral oil. Conversely, if a dry aerosol having small average particle size is desired, 70 percent deodorized kerosene mixed with 30 percent mineral oil may be used. In either case, the temperature maintained at the pressure tube should be the same, to ensure substantially complete volatilization of the kerosene portion of the mixture upon release to the atmosphere.

In operation the insecticide solution issues forth from the orifice 62 as a thin needle-like stream for about one-quarter inch, and then explodes into a fine aerosol mist as the heavier fraction is explosively dispersed into small particles.

Particle size can also be readily controlled by varying the setting of thermostatic switch 33 since the steep portions of the vaporization curves for such mixed oils occur at the final boiling point of the lower boiling oil and at the initial boiling point of the higher boiling oil.

In practice the ratio of lower boiling oil to higher boiling oil should be from 1:3 to 3:1. It has been found that a 1:1 mixture of the oils represented in FIGURE 9 results in an aerosol dispersion having an average particle size of from 5–10 microns. Carrier oils having a distillation range of from 370° to 635° F. at atmosphere are preferred.

The method of the invention provides an aerosol dispersion having a controlled particle size and yet prevents thermal deterioration of certain insecticides. The insecticide solution employing two petroleum distillate fractions having divergent boiling points provides a solution which is 100 percent active, since the oil itself possesses insecticidal properties as opposed to liquids such as water. It should be understood, however, that the term "insecticide" as used in the specification and claims includes acaricides and combinations of insecticide and synergists, other than carrier oils. Further, the insecticide carrier contains no water whatever and prevents hydrolyzing or other deleterious effects of water on the insecticide in the solution.

The apparatus as described above provides for rapid heating of the insecticide solution under pressure to prevent deterioration of the insecticide and further is economical to manufacture since unreasonably close temperature tolerances do not have to be maintained, when employed with insecticide solutions according to the invention.

It will thus be seen that the objects set forth above, among those made apparent from the preceding description, are efficiently attained and, since certain changes may be made in carrying out the above method, in the described compositions, and in the constructions set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention which, as a matter of language, might be said to fall therebetween.

Having described my invention, what I claim as new and desire to secure by Letters Patent is:

1. Apparatus for producing an aerosol dispersion, comprising in combination,
    (A) an electrical resistance heating element,
    (B) means forming a pressure chamber
        (1) in an adjacent heat exchange position to said heating element,
        (2) means forming an orifice in said pressure chamber opening to the atmosphere,
    (C) a reservoir,
        (1) having a connection to said pressure chamber for fluid communication therewith,
    (D) pressure means for moving a liquid under pressure from said reservoir to said pressure chamber,
    (E) thermostatic control means on said pressure chamber for sensing the temperature of liquid therein,
        (1) said thermostatic control means being connected to control said pressure means,
        (2) and said heating element,
whereby said pressure means is operated by said thermostatic control to move liquid under pressure from said reservoir through said pressure chamber and said orifice only when the liquid in said pressure chamber is within a predetermined temperature to explosively vaporize a portion of the heated liquid forced through said orifice under pressure and released to the atmosphere.

2. Aerosol dispersion apparatus comprising, in combination,
    (A) an electrical resistance heater,
    (B) means forming a liquid pressure chamber
        (1) in heat exchange relationship with said heater,
        (2) means communicating with said pressure chamber
            (a) having an orifice open to the atmosphere,
    (C) a reservoir for containing a liquid,
    (D) pump means connecting said reservoir to said pressure chamber for delivering liquid under pressure to said pressure chamber,
    (E) an electric motor drivingly engaged with said pump means, and
    (F) control circuit means for said heater and said motor comprising,
        (1) a thermostatic switch on said pressure chamber
        (2) said switch shunting said motor and completing an electrical circuit through said heater when closed and
        (3) placing said motor and said heater in electrical series when open,
whereby said pump means is operated by said motor only when the temperature of liquid in said pressure chamber opens said thermostatic switch to force heated liquid through said orifice under pressure.

3. The apparatus defined in claim 2 wherein said heater is provided with a second electrical resistance heating element and a second thermostatic switch on said pressure chamber completing an electrical circuit through said second heating element, said second switch operating to maintain a predetermined minimum liquid temperature in said pressure chamber.

4. In aerosol dispersion apparatus, in combination,
    (A) an electrical resistance immersion heater,
    (B) a pressure tube around said heater,
        (1) the interior of said pressure tube being closely spaced from the exterior of said heater over a substantial portion of the heater exterior, (2) means forming an orifice to the atmosphere at one end of said pressure tube,
(3) liquid inlet means adjacent the other end of said pressure tube and,
(C) pressure means for supplying a liquid to said pressure tube through said inlet, whereby liquid in said pressure tube is rapidly heated as a thin layer around said heater and is forced through said orifice under pressure to be explosively atomized in the atmosphere.

5. The combination defined in claim 4 wherein said heater comprises a plurality of electrical resistance heating elements, at least one of said elements being separately connectable to a source of electricity, said pressure means comprises a pump and an electrically powered motor, and a thermostatic switch adjacent said pressure tube electrically connected to shunt said pump motor and to supply current to at least one of said heating elements when closed, and to place said pump motor and at least one of said heating elements in electrical series when open.

6. Aerosol dispersion apparatus comprising, in combination,
(A) an electrical resistance immersion heater,
(B) a pressure tube around said heater,
  (1) the interior of said pressure tube being closely spaced from the exterior of said heater over a substantial portion of the heater exterior,
  (2) means forming an orifice to the atmosphere at one end of said pressure tube,
  (3) liquid inlet means adjacent the other end of said pressure tube,
(C) pressure means for supplying a liquid to said pressure tube through said inlet,
(D) temperature control means on said pressure tube,
  (1) operably connected to said heater,
whereby liquid in said pressure tube is rapidly heated as a thin layer around said heater and is forced through said orifice under pressure to be explosively atomized.

7. The combination defined in claim 6 wherein said temperature control means comprises a thermostatic switch and said pressure means comprises a pump and electric motor, said thermostatic switch being connected to shunt said pump motor in one position and to place said heater and said pump in electrical series in a second position to control said electric pump motor and said heater.

8. In aerosol dispersion apparatus having a reservoir of liquid to be dispersed as an aerosol, in combination:
(A) an electrical resistance immersion heater,
(B) a pressure tube around said heater,
  (1) the interior of said pressure tube being closely spaced from the exterior of said heater over a substantial portion of the heater exterior,
  (2) means forming an orifice to the atmosphere at one end of said pressure tube,
  (3) liquid inlet means adjacent the other end of said pressure tube,
(C) pressure means for supplying a liquid from said reservoir to said pressure tube through said inlet, and
(D) thermostatic control means on said pressure tube,
  (1) said thermostatic control means being connected to coordinate the operation of said pressure means with said heater,
whereby the liquid is rapidly heated in said pressure tube and the temperature and pressure of the liquid in said pressure tube is controlled within predetermined limits to keep it substantially as a liquid in said pressure tube until release to the atmosphere through said orifice to create an aerosol dispersion.

9. The combination defined in claim 8 wherein said pressure means is an electrically driven pump and said thermostatic control means operates said heater and said pump in electrical series in a first position and shunts the electrical supply circuit to said pump in a second position.

10. The combination defined in claim 8 wherein said heater is provided with a pair of electrical resistance elements, said thermostatic control means comprising first thermostatic switch means for coordinating the operation of said pressure means and one of said heater elements and second thermostatic switch means for independently controlling the other of said heater elements.

References Cited by the Examiner
UNITED STATES PATENTS

| | | | |
|---|---|---|---|
| 1,554,219 | 9/25 | Kitchen | 239—133 X |
| 1,764,387 | 6/30 | Buchet | 239—133 |
| 2,402,402 | 6/46 | Hickman | 43—129 |
| 2,432,372 | 12/47 | Besler | 252—359 |
| 2,440,915 | 5/48 | Roehr | 252—305 |
| 2,460,792 | 2/49 | Pabst et al. | 167—28 |
| 2,576,976 | 12/51 | Stagner | 219—273 |
| 2,615,215 | 10/52 | Stagner | 21—119 |
| 2,662,332 | 12/53 | McIntire | 43—129 |
| 2,821,986 | 2/58 | Tenney | 43—129 |
| 2,944,029 | 7/60 | Jones et al. | 252—305 |
| 3,030,266 | 4/62 | Cuille et al. | 167—42 |
| 3,052,599 | 9/62 | Vartanian et al. | 167—42 |

OTHER REFERENCES

Modern Colloids by R. B. Dean, page 273, published 1948 by D. Van Nostrand Co. Inc., New York, N. Y.

SAMUEL KOREN, *Primary Examiner.*

F. RAY CHAPPELL, *Examiner.*